UNITED STATES PATENT OFFICE.

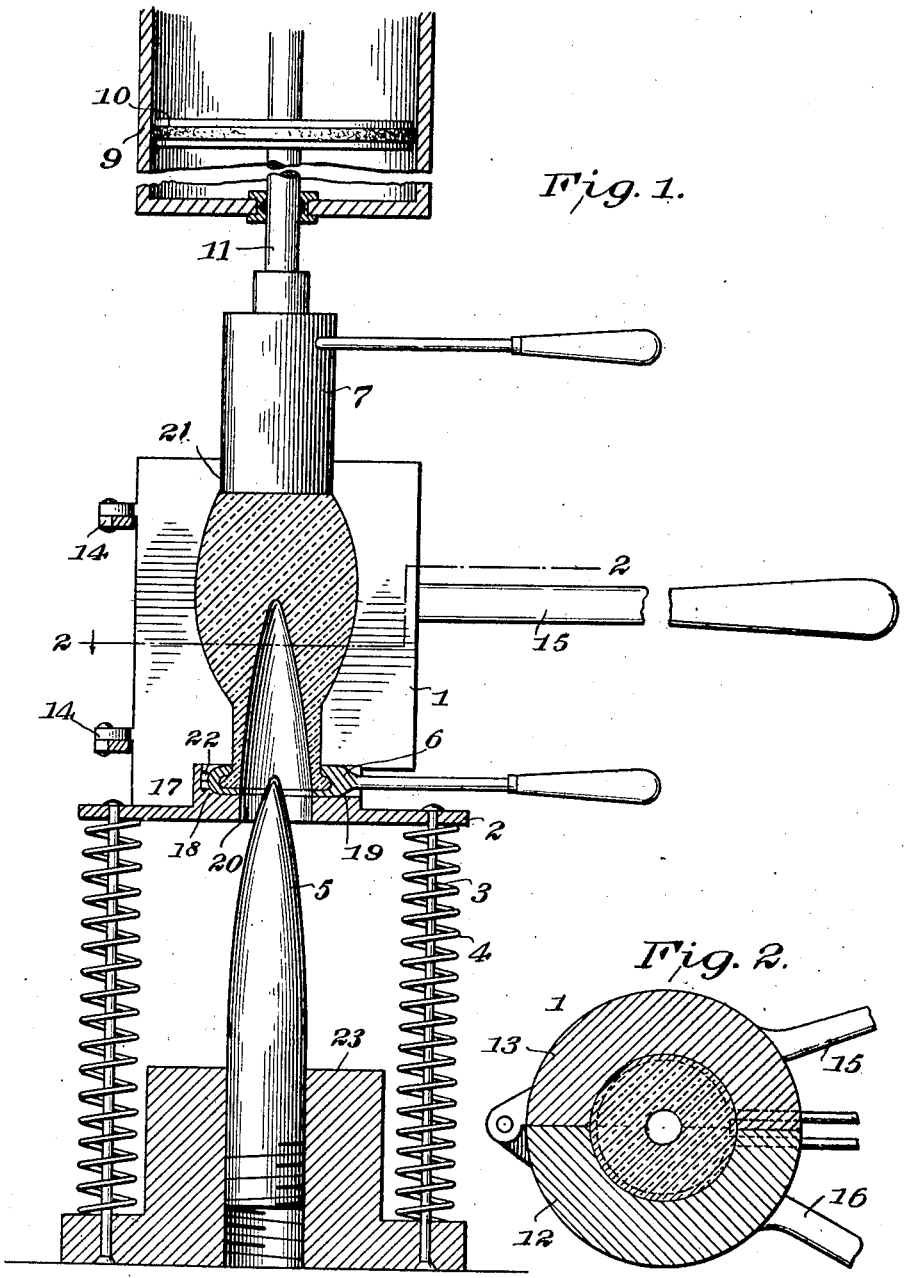

WALTER E. SAVAGE, OF BALTIMORE, MARYLAND.

MACHINE FOR MAKING BOTTLE-BLANKS.

944,053.

Specification of Letters Patent. Patented Dec. 21, 1909.

Application filed July 21, 1909. Serial No. 508,790.

*To all whom it may concern:*

Be it known that I, WALTER E. SAVAGE, a citizen of the United States of America, residing at 1638 Jackson street, in the city of Baltimore, State of Maryland, have invented certain new and useful Improvements in Machines for Making Bottle-Blanks, of which the following is a specification.

This invention relates to an apparatus for forming bottle blanks and particularly to an apparatus adapted to the production of blanks for making narrow-necked bottles.

The production of bottles by machinery in large quantities is successfully practiced at the present time. Defined in general terms, the method followed consists in depositing the gather in a press mold, applying a separate neck mold at the mouth of the press mold, and driving a punch or former into the mouth of the mold, whereby the glass is displaced and caused to flow into the neck mold, forming the neck of the bottle. The next step in the process is to open the press mold and remove the blank thus formed, holding it by means of the neck mold. The blank is then placed in a blow mold and the bottle completed therein.

The method described has not proved successful in the production of narrow-necked bottles and large numbers of these are at present made by hand. The difficulty encountered relates to the introduction of the gather into the press mold. In a large-neck mold, the glass can be introduced through the neck. In making small bottles, the size of the neck of the mold interferes with the introduction of the glass. To overcome this difficulty, I have provided a press mold which, in addition to being open at the neck end, has a large opening for the introduction of glass at the end corresponding to the bottom of the bottle. This end of the mold will hereinafter be known as the bottom of the mold. To avoid the necessity of introducing the glass from beneath, the press mold is inverted. It is supported in this position to move vertically in the line of the bottle axis, the upper end of the former extending a short distance into the neck mold to be hereinafter described. Springs, or other suitable yielding means, are provided to support the mold also suitable means are provided for compressing the glass within the mold and depressing the mold to receive the former. This may be in the form of a plunger fitting the aperture in the bottom of the mold, to be placed therein after introducing the glass, and suitable means, shown in the form of an air cylinder and piston, for depressing the plunger whereby the glass in the mold is compressed and caused to flow into the neck mold and the mold itself is driven downward so that the plunger passes through the neck mold and the neck aperture of the press mold, forming the neck of the bottle. When the pressure is removed from the plunger, the springs tend to return the press mold to normal position, whereby the plunger is withdrawn. The press mold is opened and the blank held in the neck mold is transferred to the blow mold where the process of making the bottle is completed.

The accompanying drawings illustrate so much of an apparatus embodying my invention as is necessary to understand its operation.

The device illustrated is intended to be operated by hand but it is apparent that mechanical means for moving the parts may be supplied within the scope of my invention.

Figure 1 is a vertical, axial cross-section of the apparatus with a finished blank therein just subsequent to pressing. Fig. 2 is a horizontal section through the mold on the line 2—2 of Fig. 1.

The apparatus, as shown, consists of a press mold 1, a cross-head or support 2, cross-head guides 3, supporting springs 4, a punch or internal neck former 5, a neck mold 6, a plunger 7, and a press consisting of a cylinder 9 and a fluid operated piston 10 carrying a piston rod 11.

The mold 1, as shown, is divided on its long diameter to form two parts, 12 and 13. These are hinged at 14 and provided with handles, 15 and 16, by means of which the mold may be manually operated. On its lower surface surrounding the neck portion, the press mold is cut away to form a short vertical cylindrical aperture 17. The aperture 17 incloses a centrally apertured boss or ring 18 on the cross-head plate 2. The aperture 20 in the boss is concentric with and of slightly less diameter than the neck of the press mold. The upper surface of the boss 18 is hollowed out around the aperture 20 to form a seat 19 for the neck mold 6. The press mold 1 has at its upper end, which corresponds to the bottom of the bottle, an opening 21 leading into the mold aperture for the introduction of the gather, and fitting this opening 21 is a plunger 7 in the form of a plug which may be manually moved and placed in the opening at will. The plunger is actuated by means of a press or any suitable means for applying the requisite pressure.

In the operation of the device, the neck mold 6 which is split and pivoted at 22 is first closed and placed in its seat 19 in the boss 18 of the plate 2. The press mold 1 is next placed on the plate, the aperture 17 inclosing the boss 18 and the operative end of the neck mold 6. The plunger 7 is removed and a gather of glass placed in the press mold. It will be noted that the upright punch or internal neck former 5 which is secured to a stationary support 23 extends upward so that its extremity is within the neck mold. This plunger, together with the neck mold and the edges of the plate 2 adjacent the aperture 20, serve to support the glass and prevent its escaping downward through the neck. This action is aided by the fact that the glass is slightly cooled at this point and less fluid than the remainder of the gather. The plunger 7 is now placed with its lower extremity in the aperture 21 and depressed, as by admitting fluid under pressure to the cylinder 9. The piston 7 compresses the glass in the press mold 1, causing it to flow downward into the neck of the mold and into the neck mold 6, and the pressure on the plunger also depresses the mold 1 against the tension of the springs 4, whereby the punch 5 is caused to enter the aperture in the mold, passing through the neck mold 6 and forming the bottle neck. Upon the pressure being removed from the plunger 7, the springs 4 return the mold to its normal position, whereby the former 5 is withdrawn. The mold 1 is next opened and removed, when the blank which is held in the neck mold 6 may be removed and placed in a suitable blow mold.

Having thus described my invention, what I claim and desire to secure by Letters Patent is:

1. In an apparatus for making bottle blanks, a press mold open at both ends and mounted to move in the direction of its axis, a neck mold to coöperate with the neck end of the press mold, a former adapted to enter the neck of the mold and disposed toward the same, a plunger to enter the bottom end of the press mold, and means for pressing the plunger toward the former, whereby the glass is compressed and the former caused to enter the neck of the mold, forming the neck of the bottle.

2. In an apparatus for making bottle blanks, a press mold open at both ends, mounted to move in the direction of its axis and placed with the bottom end up, a neck mold, an upright internal former supported in the line of the axis of the neck, and means entering the bottom end of the press mold to compress the charge and move the molds downward along the line of the axis, causing the former to enter both molds to form the bottle neck.

3. In an apparatus for making bottle blanks, a press mold open at both ends, mounted to move in the direction of its axis and placed with its bottom end up, a separate neck mold, an internal former supported in line with the neck, and means entering the bottom end of the mold to compress the charge and move the molds along the line of the axis toward the former, causing the latter to enter both molds to form the bottle neck, and means for returning the press and the neck molds to normal position.

4. In an apparatus for making bottle blanks, a press mold open at both ends, mounted to move in the direction of its axis and placed with its bottom end up, a separate neck mold, an internal former supported in line with the neck, and means entering the bottom end of the mold to compress the charge and move the mold along the line of its axis toward the former, causing the latter to enter both molds to form the bottle neck, and yielding means for returning the mold and withdrawing the former.

5. In an apparatus for making bottle blanks, a press mold open at both ends, mounted to move in the direction of its axis and placed with the bottom end up, a separate, manually operable neck mold, an internal former supported in line with the axis of the neck, a manually movable plunger entering the bottom end of the press mold, and means for actuating the plunger to compress the charge and move the mold along the line of its axis to cause the plunger to enter the neck.

6. In an apparatus for making bottle blanks, a press mold open at the bottom to receive the gather and placed with the neck downward, a plunger to enter the bottom of the press mold, a neck mold, yielding means for supporting the press mold and neck mold in normal position, an upright, stationary, internal neck former, and means for pressing the plunger downward to compress the gather, driving the press mold downward over the former, the latter passing through the neck mold and entering the press mold.

7. In an apparatus for making bottle blanks, a press mold open at the bottom to admit the gather and mounted to move in the direction of its axis, a neck mold coöperating with the press mold, an internal former, a plunger to enter the opening in the bottom of the mold, means for pressing the plunger toward the interior of the press mold, whereby the press mold is moved to a position inclosing the former and the former is passed through the neck mold and caused to enter the neck of the press mold, and yielding means tending to return the press mold to normal position.

8. In an apparatus for making bottle blanks, a mold open at the neck and bottom, mounted to move in the direction of its axis, an internal former supported in line with the neck of the mold, means for closing the bottom of the mold, and means for moving the mold to cause the former to enter the neck of the mold, compressing the glass and forming the bottle neck.

Signed by me at Baltimore, Maryland, this 20th day of July, 1909.

WALTER E. SAVAGE.

Witnesses:
WALTER G. OLMSTEAD,
S. RALPH WARNKEN.